JAMES M. MOREHEAD.
Improvement in Steam-Traps.

No. 126,899.  Patented May 21, 1872.

126,899

UNITED STATES PATENT OFFICE.

JAMES M. MOREHEAD, OF BROOKLYN, NEW YORK.

IMPROVEMENT IN STEAM-TRAPS.

Specification forming part of Letters Patent No. 126,899, dated May 21, 1872.

SPECIFICATION.

Be it known that I, JAMES M. MOREHEAD, of the city of Brooklyn, county of Kings, State of New York, have invented certain Improvements in Steam-Traps; and do hereby declare that the following description, taken in connection with the accompanying drawing hereinafter referred to, forms a full specification of the same.

The nature and object of my invention consist in making the upper part of the cylinder of steam-traps, with a chamber or reservoir for holding water attached to the side of the cylinder, and leading into the chamber or reservoir to a pipe filled with water, which acts as a hydrostatic column. Connected with the bottom of the cylinder is a flexible diaphragm, with a metallic weight resting upon its upper surface. A rod is then inserted in the weight, the upper part of which constitutes a valve that operates to close the opening made in the discharge-pipe. On the upper and opposite side of the cylinder is a steam-pipe leading into the chamber or reservoir. At the bottom end of the hydrostatic column is a cock for discharging the water in chamber or reservoir, when required. I also use my improved hydrostatic steam-trap for feeding boilers.

In the accompanying drawing, which illustrates my invention and forms a part of the specification thereof, in which corresponding parts are illustrated by similar letters—

Figure 1:
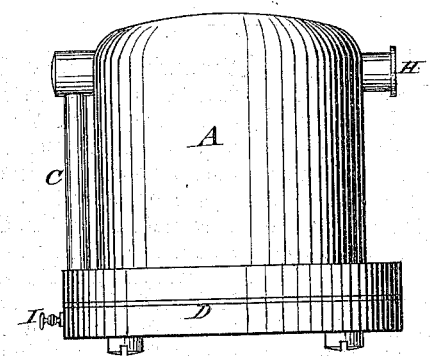
Figure 2:
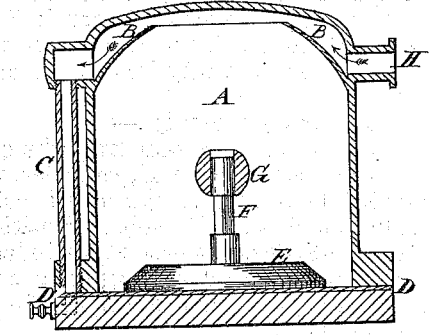
Figure 3:
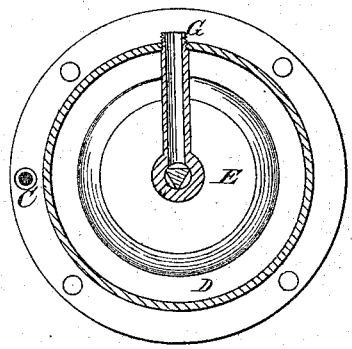

Figure 1 is a side view of my improved hydrostatic steam-trap; Fig. 2, a sectional view of the same. Fig. 3 is a detail view, showing the flexible diaphragm, the weight, and rod-valve.

In the drawing, A represents the cylinder; B, the chamber or reservoir; C, the hydrostatic column; D, the flexible diaphragm connected with the bottom of the cylinder A; E, the weight resting upon the diaphragm D; F, the rod or valve; G, the discharge-pipe; H, the steam-pipe; and I, the discharge-cock.

The operation of my improved hydrostatic steam-trap is as follows: The steam, passing through the pipe H into top of cylinder A, fills the same, while the water formed by the condensation of the steam fills the chamber or reservoir B and the outside pipe or hydrostatic column C, (as shown in Figs. 1 and 2 by arrows 3 and 4.) The hydrostatic pressure then acts upon the flexible diaphragm D, and raises the weight E resting on the surface of the diaphragm D, which carries the rod and its valve F upward and closes the opening of the discharge-pipe G, thereby preventing the steam from escaping out of the discharge-pipe G, and also holds the valve F tightly in place until the water has filled the cylinder A to a certain height, when it is counteracted by the pressure of the hydrostatic column C, (see Fig. 2,) thereby lowering the water, which causes the weight E to fall by its own gravity and opens the valve F, and, in connection with the pressure of the steam upon the water in the cylinder A, forces it through the discharge-pipe G until the flexible diaphragm D is raised again by the pressure of the hydrostatic column C.

Should it be necessary to discharge the water from the chamber or reservoir B and hydrostatic column C, the discharge-cock I, at the lower end of the hydrostatic column C, is opened.

I claim as my invention—

In a hydrostatic steam-trap, the combination of the steam-pipe H, chamber or reservoir B, outside pipe or hydrostatic column C, flexible diaphragm D, weight E with its rod and valve F, discharge-cock I, cylinder A, and discharge-pipe G, all arranged and operating substantially as herein shown, and for the purposes set forth.

In testimony that I claim the foregoing I have hereunto set my hand and affixed my seal this 4th day of March, A. D. 1872.

JAMES M. MOREHEAD. [L. S.]

In presence of—
  LOUIS W. FROST,
  CHARLES G. COE.